United States Patent [19]
Suppelsa et al.

[11] Patent Number: 5,808,711
[45] Date of Patent: Sep. 15, 1998

[54] TRANSPARENT OR REFLECTIVE LIQUID CRYSTAL DISPLAY ASSEMBLY WITH ELECTROCHROMIC AND CHOLESTERIC LAYER

[75] Inventors: Anthony J. Suppelsa, Coral Springs; Michael F. Shaw, Sunrise; Thomas J. Swirbel, Davie, all of Fla.

[73] Assignee: Motorola, Inc., Schaumburg, Ill.

[21] Appl. No.: 916,212

[22] Filed: Aug. 22, 1997

[51] Int. Cl.[6] .................. G02F 1/1347; G02F 1/1335
[52] U.S. Cl. ........................ 349/74; 345/49; 345/267; 349/176; 349/106
[58] Field of Search ................. 349/74, 77, 114, 349/115, 86, 1, 176, 106; 345/48, 49, 263, 265, 267; 359/263, 265, 267; 348/795, 800

[56] References Cited

U.S. PATENT DOCUMENTS

| | | | |
|---|---|---|---|
| 4,991,924 | 2/1991 | Shankar et al. | 350/96.15 |
| 5,493,340 | 2/1996 | Lu et al. | 349/106 |

*Primary Examiner*—Anita Pellman Gross
*Assistant Examiner*—Kenneth Parker
*Attorney, Agent, or Firm*—Dale W. Dorinski

[57] ABSTRACT

A liquid crystal display assembly (10) can function in either a transparent or reflective mode. The assembly consists of a reflective-type liquid crystal display cell (12) placed in front of an electrochromic panel (14). When a display driver (16) activates the electrochromic panel, it absorbs light. When the driver energizes segments (15) of the reflective-type liquid crystal display cell, they become reflective, providing a visual image to an observer. When the electrochromic panel is not activated by the driver, it is transparent or translucent, allowing the observer to see completely through the liquid crystal display assembly.

9 Claims, 4 Drawing Sheets

TRANSPARENT OR REFLECTIVE LIQUID CRYSTAL DISPLAY ASSEMBLY WITH ELECTROCHROMIC AND CHOLESTERIC LAYER

TECHNICAL FIELD

This invention relates to liquid crystal display devices in general, and more particularly, to a liquid crystal display device that can function in both a reflective mode and a transmissive mode.

BACKGROUND

Display technologies are usually characterized as either emissive or non-emissive. The most common emissive display is a light emitting diode (LED) and the most common non-emissive is liquid crystal (LCD). In either case, the display is usually opaque in the off-state with no light transmitting through it. In the case of an LCD it is possible to fabricate a display which is 30% transparent in the off-state by using polarizing sheets on the front and back of the display. However, to view features on this kind of display, a bright backlight source is needed and the contrast is limited. Another type of liquid crystal display is reflective. The most common reflective displays place a reflective material behind the rear polarizer of the LCD and instead of using a backlight, ambient light is used as the source. This type of display does not transmit light in any state. Another form of reflective display technology does not require front or rear polarizers, rather the liquid crystal material itself selectively scatters or reflects light. These types of displays use a black sheet on the rear of the display to provide contrast between select and nonselected states. Without the black sheet the select state would be transparent and the nonselected state a milky white. In each of these prior art situations, the user is forced to accept compromises in the type of display, and none of the prior art provides a display that can allow objects that are behind the display to be viewed.

DETAILED DESCRIPTION OF THE PREFERRED EMBODIMENT

A liquid crystal display assembly can function in either a transparent or reflective mode. The assembly consists of a reflective-type liquid crystal display cell disposed in front of an electrochromic panel. When a display driver activates the electrochromic panel, it absorbs light. When the driver energizes segments of the reflective-type liquid crystal display cell, they become reflective, providing a visual image to an observer. When the electrochromic panel is not activated by the driver, it is transparent or translucent, allowing the observer to see completely through the liquid crystal display assembly. The same effect can be achieved with a slightly different structure, using a nematic liquid crystal display cell disposed in front of a reflective-type liquid crystal display cell. When the display driver activates the reflective-type liquid crystal display cell, it reflects light. When the driver energizes segments of the nematic liquid crystal display cell, they become absorbent, providing a visual image to an observer. When the reflective-type liquid crystal display cell is not activated by the driver, it is transparent or translucent, allowing the observer to see completely through the liquid crystal display assembly. The invention utilizes a number of display technologies that, when combined together, enable the user to view information from the display, see completely through the display assembly (i.e. make the display completely transparent), to reflect light off the assembly, or to absorb light with the assembly.

Figure 1:
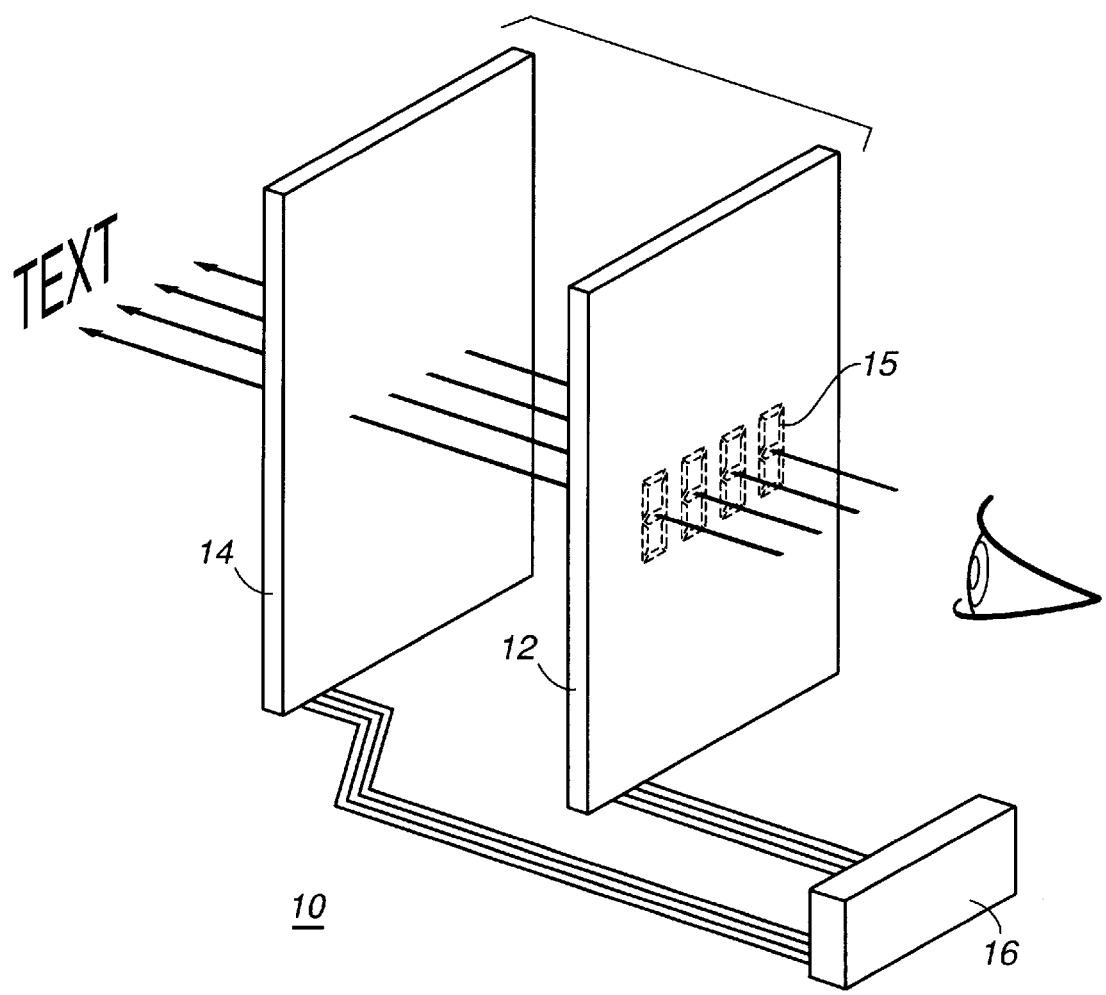
FIG. 1 is a schematic representation of a liquid crystal display assembly in the "off" or transmissive mode, in accordance with the invention.

While the specification concludes with claims defining the features of the invention that are regarded as novel, it is believed that the invention will be better understood from a consideration of the following description in conjunction with the drawing figures, in which like reference numerals identify like elements. Referring now to FIG. 1, the liquid crystal display (LCD) assembly 10 is a stack or a sandwich made up of a first display 12 which is a reflective-type display such as a cholesteric liquid crystal (CLC) and a second display 14 which is an electrochromic (EC) panel. The reflective display is placed in front of the electrochromic panel, such that light must first pass through the reflective display before reaching the EC panel. The two components are connected to an activating means 16, such as a display driver, that activates or energizes the reflective-type display 12 and the electrochromic panel 14. In the preferred embodiment, both are connected to the same driver and are controlled simultaneously, but it is within the scope and spirit of the invention to contemplate that the EC panel can be controlled separately from the reflective display and by two separate activating means. The electrochromic panel 14 is activated such that it is either opaque to absorb light or transparent to transmit light. The EC panel acts as a background to the front LCD cell, so it is completely on or off, and is not partially activated. That is, patterns are not formed on the EC panel. The front display 12 can be operated in a conventional manner such that portions or segments 15 of it are selectively energized. This method of forming an image in the front LCD cell 12 is well known to those skilled in the art, and need not be further elaborated on here. The front display 12 does not have a reflector as in conventional art.

Figure 2:
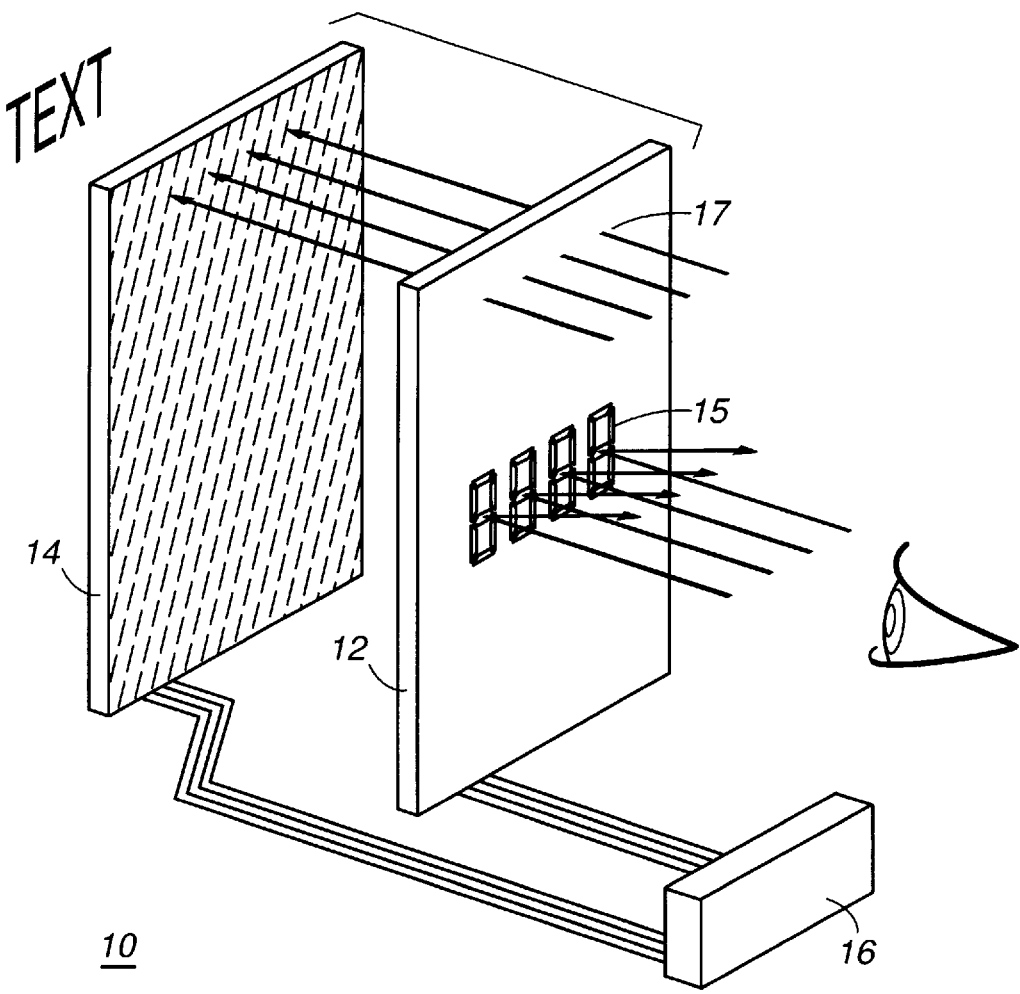
FIG. 2 is a schematic representation of a liquid crystal display assembly in the "on" or perspective mode, in accordance with the invention.

The rear display 14 serves a dual purpose—in the transmissive state, light passes completely through both the reflective-type display 12 and the electrochromic panel 14, revealing to a viewer those objects that may lie behind the display assembly 10. This is shown schematically in FIG. 1. Even if some of the segments or portions 15 of the reflective-type display 12 are energized by the display driver, the viewer would still not see an image in the display because there would not be any contrast between the energized segment 15 and the surrounding background of the transparent unenergized EC panel 14. In the reflective mode, as shown in FIG. 2, when the EC panel 14 is energized to be in the opaque or absorptive state, it provides a black or colored background to enable the reflective front display to be viewed with high contrast. Light transmitted through those portions 17 of the reflective-type liquid crystal display cell 12 that are not activated is absorbed by the activated electrochromic panel 14, and light is reflected by those portions 15 of the reflective-type liquid crystal display cell that are activated, thus forming an image that is visible to an observer. Without this black background, the selected or reflective pixels 15 of the front display would not have sufficient contrast with respect to the unselected areas. In addition, when the EC panel 14 is activated and is opaque, it hides any objects that may lie behind the LCD assembly 10 from the prying eye of an observer. In contrast to our invention, prior art LCDs utilize a solid black rear surface such as a carbon-based painted absorber to provide the contrast. However, this restricts the prior art structure to operating only in a single mode. Thus, the LCD assembly 10 can be operated as both a reflective display and as a transmissive display.

Figure 3:
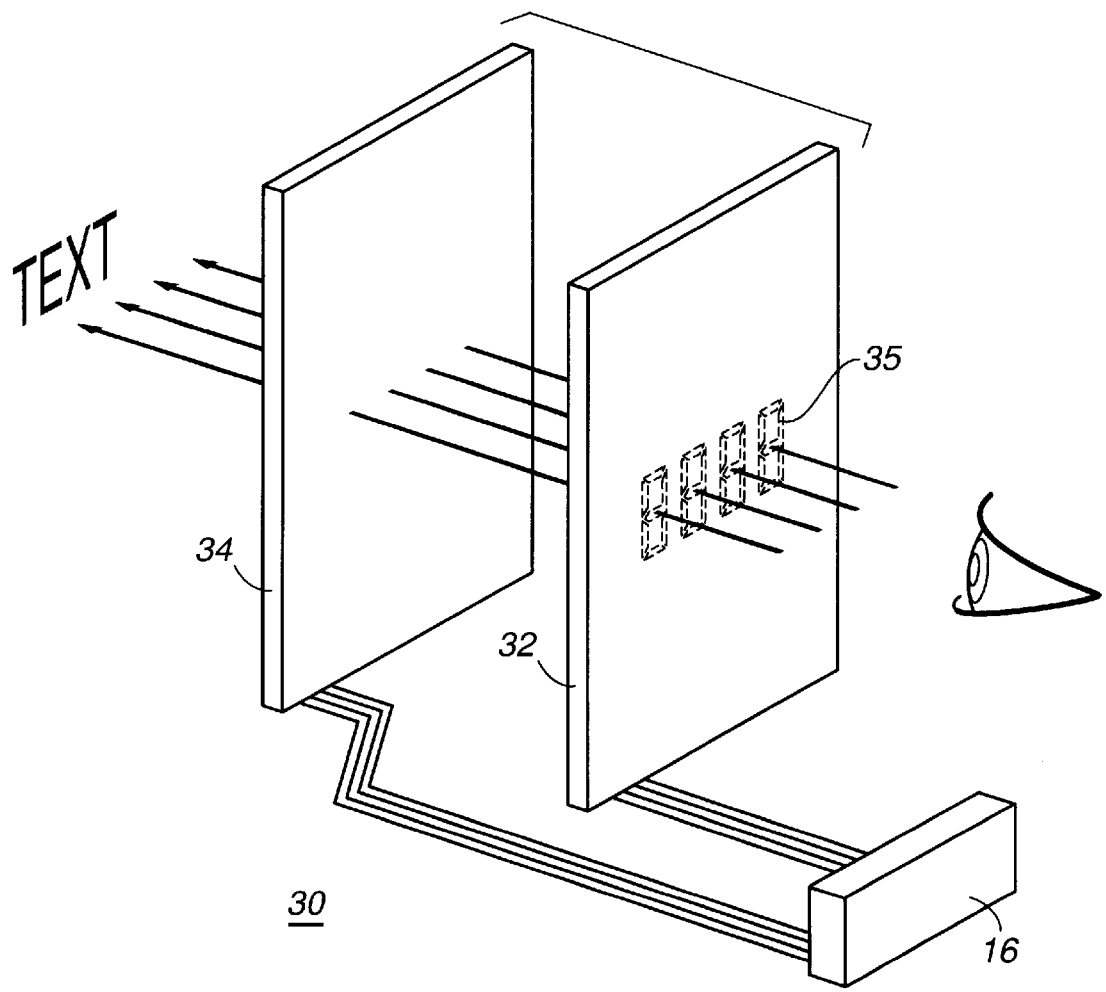
FIG. 3 is a schematic representation of a liquid crystal display assembly in the "off" or transmissive mode, in accordance with an alternate embodiment of the invention.
Figure 4:
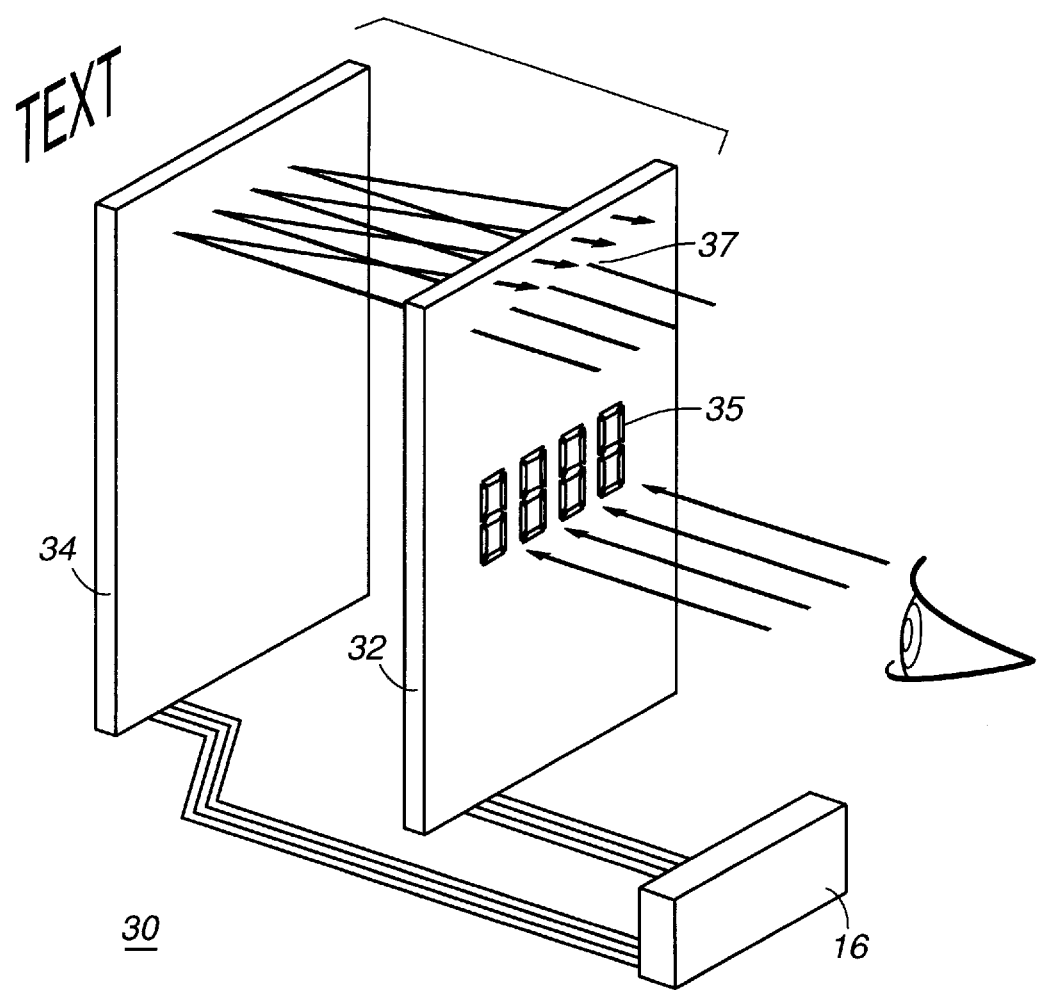
FIG. 4 is a schematic representation of a liquid crystal display assembly in the "on" or reflective mode, in accordance with an alternate embodiment of the invention.

A second embodiment of our invention is shown in FIGS. 3 and 4. Here, the concept is similar to that previously elucidated, but the front or first display 32 is a nonreflective type of display such as a nematic liquid crystal (NLC). NLC cells typically rotate linear polarization states (for example, twisted nematic liquid crystal cells) or transform polarization states. Typically these effects are accomplished by applying an electric field across the NLC layer. NLC cells are typically used with an external polarizer. In our invention, the NLC cell can be a twisted nematic or super twisted nematic liquid crystal display, and a reflective type display is used as the second display 34, i.e. as the back panel. Here again, the two components are connected to an activating means 16, such as a display driver, that activates or energizes the nematic LCD cell 32 and the reflective-type display 34. In the preferred embodiment, both are connected to the same driver and are controlled simultaneously, but it is certainly within the scope and spirit of the invention to contemplate that the reflective-type display 34 can be controlled separately from the nematic LCD cell 32, and that the activating means can be two separate components. The reflective panel 34 does not have to contain selective features or segments, but instead, the entire panel is switched between transparent and reflective states. Using this construction, the front display 32 is the active unit used to display information and the rear display 34, when in the reflective state, serves the function typically done by prior art laminated chrome reflector sheets. However, unlike the prior art laminated sheets, the rear panel of our novel construction may be made transparent at the same time the front display is not energized, so that the entire display unit 30 is transparent. This enables a viewer to have optical access to whatever is behind the display. Now when the LCD assembly 30 is operated in the absorptive mode, as shown in FIG. 4, the reflective-type display 34 is energized to be in the reflective state, it provides a highly reflective background to enable the nematic front display 32 to be viewed with high contrast. Light transmitted through those portions 37 of the nematic LCD cell 32 that are not activated is reflected by the activated reflective-type display 34, and light is absorbed by those portions 35 of the nematic LCD cell that are activated, thus forming an image that is visible to an observer. Without this reflective background, the selected portions 35 of the front display would not have sufficient contrast with respect to the unselected areas. In addition, when the reflective-type liquid crystal display cell 34 is activated and is reflective, it hides any objects that may lie behind the LCD assembly 30 from the prying eye of an observer.

One of the main differences in the two embodiments is the display cell technology used in the front cell to convey the information, i.e. reflective in the first embodiment or twisted or super twisted nematic liquid crystal in the second embodiment. The choice would depend upon the end application's requirements for conveying information. That is, if the application required a high information content, the embodiment represented by FIGS. 3 and 4 would probably be used, while if the application required a bistable device, the embodiment represented by FIGS. 1 and 2 would be preferable.

In summary, our display structure uses a novel combination of known elements to take advantage of the emerging electrochromic and reflective display technologies. This structure enables light to selectively pass or not to pass through the LCD assembly. This will permit light sensing components to be activated behind the display. The displays find useful applications in markets which incorporate light sensitive devices which must be selectively activated such as pagers, 2-way radios and cellular telephones.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A direct view liquid crystal display assembly that can function as either a transparent or reflective display, comprising:

a reflective-type liquid crystal display cell disposed in front of an electrochromic panel;

activating means coupled to the reflective-type liquid crystal display cell and to the electrochromic panel;

wherein the liquid crystal display assembly is a reflective display when the activating means activates the electrochromic panel to absorb light and when the activating means activates portions of the reflective-type liquid crystal display cell to be reflective, producing a visual image on the reflective-type liquid crystal display cell for an observer; and wherein the liquid crystal display assembly is a transparent display when the electrochromic panel is not activated by the activating means, allowing the observer to see through the liquid crystal display assembly.

2. The liquid crystal display assembly as described in claim 1, wherein the activating means is a display driver.

3. The liquid crystal display assembly as described in claim 1, wherein the reflective-type liquid crystal display cell is activated by a first activating means, and the electrochromic panel is activated by a second activating means.

4. The liquid crystal display assembly as described in claim 1, wherein the electrochromic panel is black when activated.

5. The liquid crystal display assembly as described in claim 1, wherein the electrochromic panel is a color other than black when activated.

6. The liquid crystal display assembly as described in claim 1, wherein light transmitted through those portions of the reflective-type liquid crystal display cell that are not activated is absorbed by the activated electrochromic panel.

7. The liquid crystal display assembly as described in claim 6, wherein light transmitted through those portions of the reflective-type liquid crystal display cell that are not activated is transmitted by the electrochromic panel when the electrochromic panel is not activated.

8. The liquid crystal display assembly as described in claim 1, wherein light is reflected by those portions of the reflective-type liquid crystal display cell that are activated.

9. The liquid crystal display assembly as described in claim 1, wherein the driving means simultaneously activates the reflective-type liquid crystal display cell and the electrochromic panel.

\* \* \* \* \*